United States Patent
Voigtlaender et al.

(10) Patent No.: US 7,345,620 B2
(45) Date of Patent: Mar. 18, 2008

(54) METHOD AND DEVICE FOR THE ADAPTIVE REGULATION OF POWER

(75) Inventors: Klaus Voigtlaender, Wangen (DE); Stefan Gaier, Stuttgart (DE); Hans-Oliver Ruoss, Stuttgart (DE); Juergen Seidel, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 10/534,642

(22) PCT Filed: Sep. 15, 2003

(86) PCT No.: PCT/DE03/03063

§ 371 (c)(1),
(2), (4) Date: Oct. 21, 2005

(87) PCT Pub. No.: WO2004/048999

PCT Pub. Date: Jun. 10, 2004

(65) Prior Publication Data

US 2006/0109170 A1 May 25, 2006

(30) Foreign Application Priority Data

Nov. 26, 2002 (DE) .............................. 102 54 982

(51) Int. Cl.
*G01S 13/00* (2006.01)

(52) U.S. Cl. ........................ 342/82; 342/70; 342/103; 342/159

(58) Field of Classification Search ............ 342/70–72, 342/82–88
See application file for complete search history.

(56) References Cited

U.S. PATENT DOCUMENTS

| 5,345,470 | A | 9/1994 | Alexander | 375/144 |
|---|---|---|---|---|
| 5,670,962 | A | 9/1997 | Henderson et al. | 342/70 |
| 5,828,333 | A | 10/1998 | Timm et al. | 342/70 |
| 6,587,074 | B1 * | 7/2003 | Winter et al. | 342/130 |
| 7,002,511 | B1 * | 2/2006 | Ammar et al. | 342/134 |
| 2003/0119542 | A1 * | 6/2003 | Ogami | 455/522 |
| 2006/0109170 | A1 * | 5/2006 | Voigtlaender et al. | 342/82 |

(Continued)

FOREIGN PATENT DOCUMENTS

DE 197 07 936 9/1998

(Continued)

OTHER PUBLICATIONS

"Adaptive closed-loop power control with quantized feedback and loop filtering", Hsuan-Jung Su; Geraniotis, E. Wireless Communications, IEEE Transactions on vol. 1, Issue 1, Jan. 2002 pp. 76-86.*

(Continued)

*Primary Examiner*—John B Sotomayor
(74) *Attorney, Agent, or Firm*—Kenyon & Kenyon LLP (57) ABSTRACT

A method and a device for adaptively controlling power in a radar device having a radar transmitter and a radar receiver are provided, in particular for applications in vehicles. The radar signals are emitted, and radar signals reflected off of target objects are received and checked for irregularities. The transmitting power of the radar transmitter is reduced when irregularities occur which are attributable to interference caused by neighboring radar transmitters.

9 Claims, 7 Drawing Sheets

U.S. PATENT DOCUMENTS

2007/0254592 A1* 11/2007 McCallister et al. ..... 455/67.11

FOREIGN PATENT DOCUMENTS

| DE | 199 21 844 | 11/2000 |
| --- | --- | --- |
| DE | 100 65 521 | 7/2002 |
| DE | 101 08 582 | 9/2002 |

OTHER PUBLICATIONS

"Performance of adaptive transmit power control in $\pi/4$ DQPSK mobile radio systems in flat Rayleigh fading channels", Canchi, R.; Akaiwa, Y. Vehicular Technology Conference, 1999 IEEE 49th vol. 2, Jul. 1999 pp. 1261-1265.*

* cited by examiner

Fig.1

Prior Art

METHOD AND DEVICE FOR THE ADAPTIVE REGULATION OF POWER

FIELD OF THE INVENTION

The present invention is directed to a method and a device for adaptively controlling power of transmitted signals of a radar detector.

BACKGROUND INFORMATION

In the automotive sector, systems which measure the distances and velocities of objects around one's own vehicle by using microwaves and applying the radar principle are in use. These objects can be vehicles which are actively taking part in the highway traffic or some sort of obstacles on or near the road. Keyless remote-entry systems for vehicles (keyless entry/comfort entry/keyless go systems) also make use of these technologies. In the known systems, high-frequency energy is radiated in a frequency range in the gigahertz range, at a mid-frequency of 24,125 GHz and with a two-way bandwidth of several GHz. Typical antennas have a directional characteristic (i.e., an antenna radiation pattern) of 80 degrees*20 degrees. In practice, the transmission range is about 20 m. The risk inherent in such systems is that unacceptably high signal levels occur, even in frequency ranges that have been blocked in favor of other services, e.g., frequency ranges that are reserved for radio astronomy or also for radio relay services. Unacceptably high signal levels can occur, for example, when a substantial number of the above-mentioned systems in the surrounding, for example several hundred, are simultaneously put into operation. This can be the case, for example, when a large number of vehicles are moving on multilane urban streets. Similar problems arise in large parking lots at sports facilities or shopping centers when, for example, after a big event ends, hundreds of vehicles start moving at the same time and leave the parking lot. For the most part, these problems only occur when the vehicles are at standstill or traveling at a relatively slow speed. This is because, at higher speeds, the distances between the vehicles increase again, and the vehicle density decreases correspondingly. Furthermore, the spatial proximity of many sensors also causes heavy mutual interference, which, when working with adaptive sensors, increasingly leads to additional measurements being taken, although some objects may have actually already been reliably detected.

Published German Patent Application DE 100 65 521 describes a method and a device for detecting moving or stationary objects using radar radiation, in particular for use in motor vehicles, where, in order to detect objects, pulse-modulated carrier waves are radiated, whose reflected portions are then received and evaluated. In this context, by transmitting an unmodulated carrier in the time intervals between two adjacent pulses, a Doppler measurement can additionally be performed, thereby enabling a reliable velocity measurement to be taken.

When irregularities are detected in received signals, the transmitting branch of the radar may be switched off. Thus, no more transmission signals are emitted by the transmitting antenna. However, correlation pulses from a pulse transmitter continue to be transmitted to the receiving branch of the radar sensor. If it turns out in the process that object information is still received, then an illusory object must be inferred.

SUMMARY

The present invention minimizes signal irregularities in radar detectors by using an adaptive power control. As soon as it becomes apparent that the interference is unacceptably high due to a heavy traffic density, an appropriate power adaptation is carried out. Once objects have been reliably detected, the measurement repetition rate may be reduced. In addition, the possible detection range does not need to be utilized up to the maximum value; instead, it may be stopped once a limit to be regarded as useful is reached, such as of two to five detected objects, especially as the power requirement increases with the fourth power of the distance. Provided that a ground speed is measurable, at a low speed of less than about 20 to 40 km/h or at standstill, and in the case of far away objects, the power may likewise be reduced by limiting the average power, the measurement repetition frequency, or the maximum distance. The relatively low speed makes it unlikely that objects would appear unexpectedly. If necessary, however, a measurement may also be made in-between, up to the maximum range, in order to secure the intervening space up to the furthest object, and thereby enhance the safety on the whole. The speed information may be obtained from the wheel speeds, from a radar measurement which records the ground speed, or from an SRR (secondary surveillance radar) measurement by estimating stationary objects. While the first two mentioned methods lead to very reliable results, the last-mentioned method additionally requires an exact classification into illusory objects, on the one hand, and tangible moving objects, on the other hand, to attain reliable results. Since in situations of high traffic density and, thus, a high concentration of sensors, the interfering influences increase, in which case the present invention also makes it possible to adaptively reduce the power within a relatively short range, provided that reliably detected objects exist. The present invention makes it possible for the transmitting power to be reduced, thereby facilitating an approval in conformance with UWB (ultra-wide band) criteria. By reducing the transmitting power, the interference immunity may be further enhanced. This means that there is less mutual interference among adjacent vehicles. The reduced transmitting power leads to a lower current consumption, which is beneficial in terms of energy usage. Also, because of the reduction in load, one can expect a longer service life. By applying the approach of the present invention, assuming a maximum distance of 20 m and a breaking off of the emissions in the distance stages 5 m, 10 m or 15 m, the average power could be reduced by 30 db, 15 db, and 6 dB, respectively. Consequently, the spectral density is, of course, also lowered. In addition, the transmitted power could also be lowered by approximately 6 to 20 dB.

DETAILED DESCRIPTION

Figure 1:
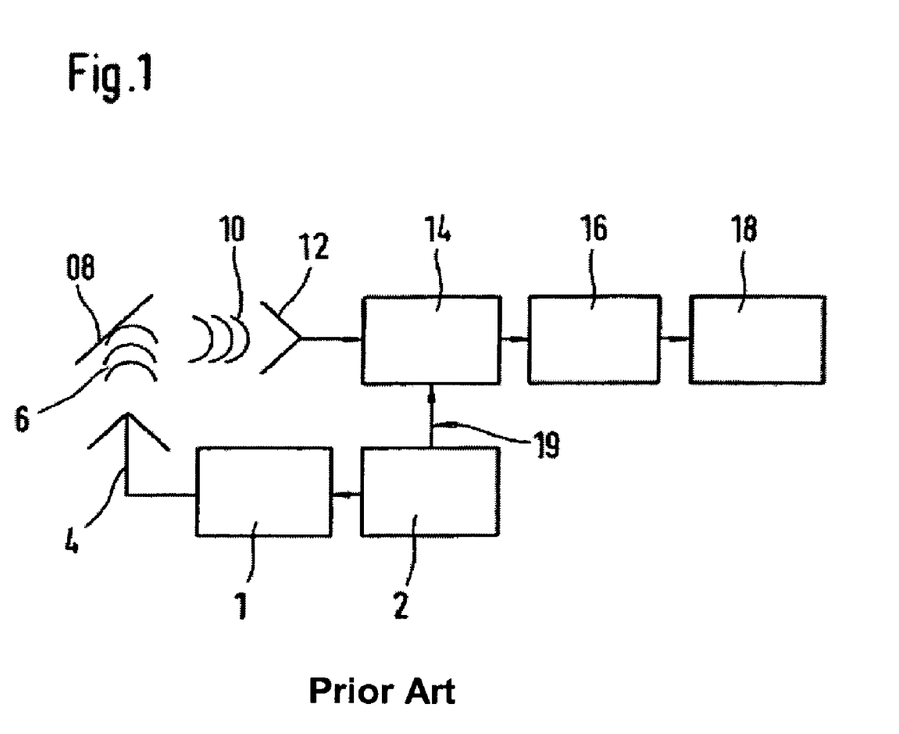
FIG. 1 shows a conventional radar device of the related art.

In a block diagram, FIG. 1 shows a radar device having a correlation receiver as known in the art. A pulse generator 2 induces a transmitting device 1 to emit a transmitted signal 6 via an antenna 4. Transmitted signal 6 impinges on a target object 8, where it is at least partially reflected, and returns to receiver 14. Received signal 10 is received by antenna 12. In this context, antenna 12 and antenna 4 may be identical and be switched between transmitting and receiving operation. Upon receipt of received signal 10 by antenna 12, received signal 10 is routed to receiver 14 and subsequently fed via a filter device having A/D conversion 16 to an evaluation device 18. An exceptional feature of such a radar device, which has a correlation receiver, is that receiver 14 receives a reference signal 20 from pulse generator 2. Received signals 10 received by receiver 14 are mixed in receiver 14 with reference signal 20. The correlation operation makes it possible to infer the distance of a target object, for example, on the basis of the temporal delay from emission of a radar signal until receipt of a radar signal reflected off of a target object.

Figure 2:
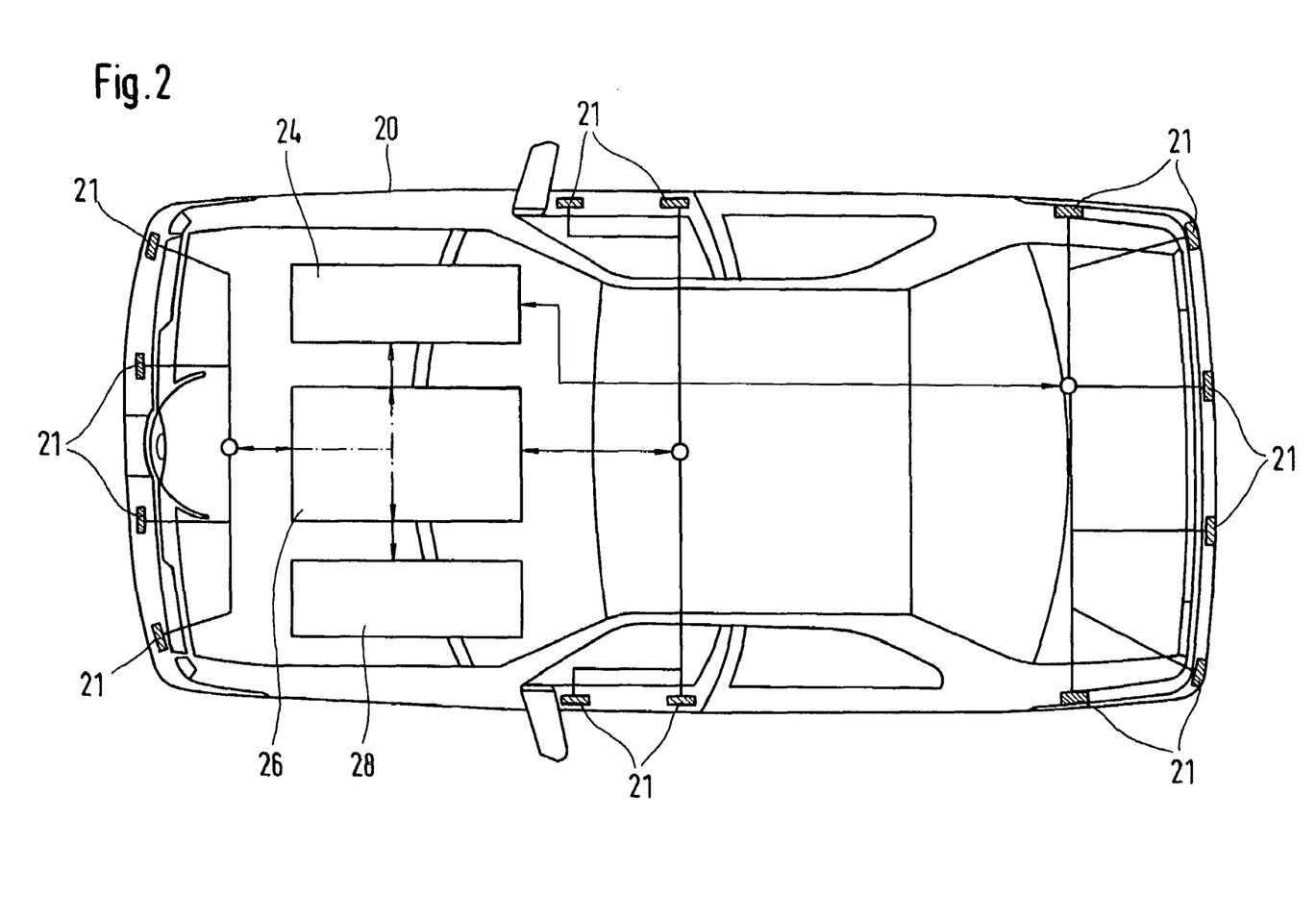
FIG. 2 shows a motor vehicle having radar devices.

It is possible to operate a plurality of substantially identical, e.g., between 4 and 16, radar sensors on one vehicle. This is clearly shown in FIG. 2, which illustrates a motor vehicle 20 having a multiplicity of radar sensors 21. Radar sensors 21 are interconnected via a bus to one another and to control devices. For example, a device 24 for providing a park distance control and for detecting a blind spot, a device 26 for the precrash function, as well as a device 28 for facilitating travel in stop-and-go traffic are provided.

Figure 3:
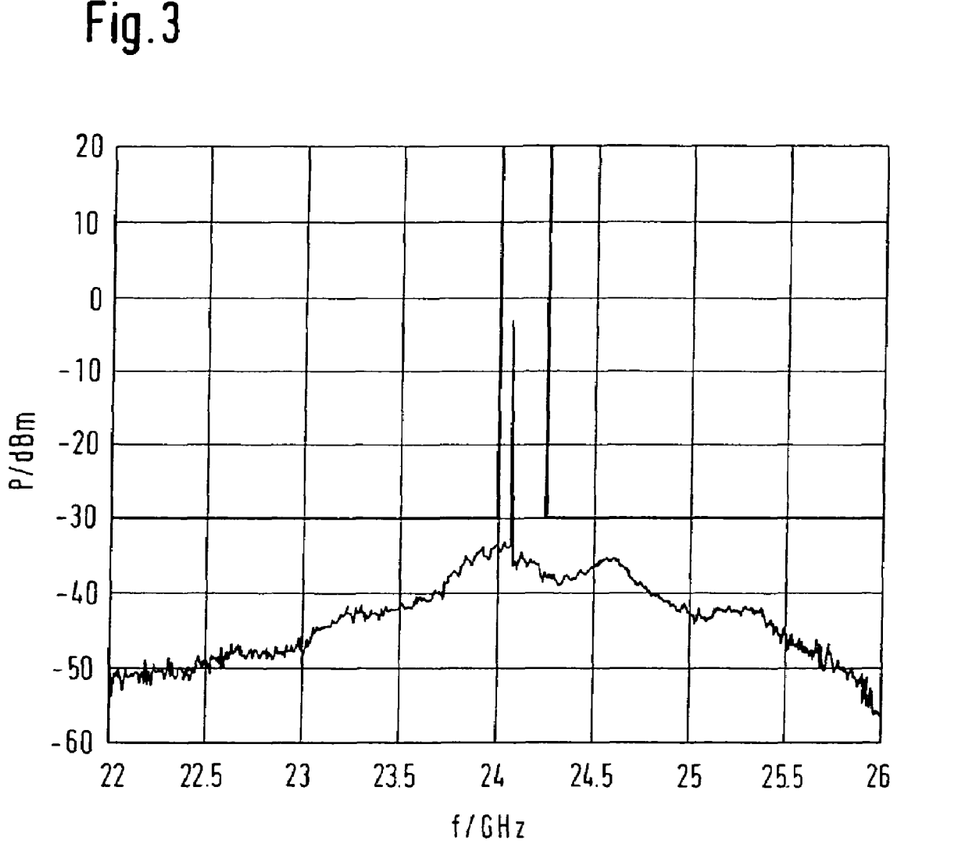
FIG. 3 shows a graph of a radar signal of a radar device.

FIG. 3 shows a typical radar signal which is transmitted by a radar device working in the short range. When working with a radar device of this kind, high-frequency energy is radiated in a frequency range in the gigahertz range, at a mid-frequency of 24,125 GHz and with a two-way bandwidth of several GHz.

Figure 4:
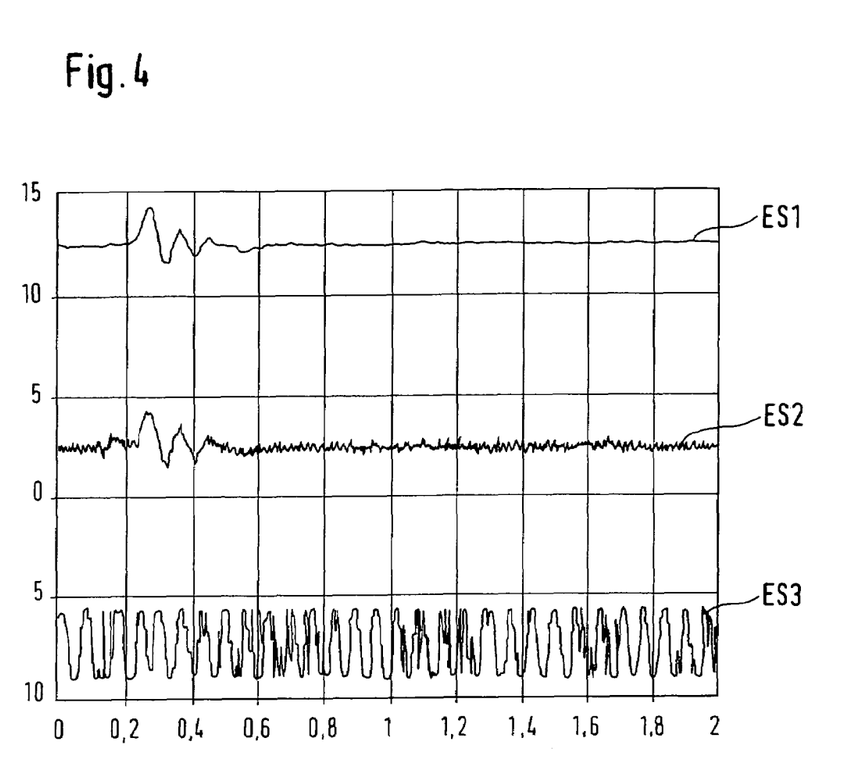
FIG. 4 shows a graph of radar signals having interference of varying intensity.

FIG. 4 shows typical received signals which have been picked up by a radar device working in the short range. The characteristic curve of first received signal ES1 shown in the upper part of the diagram is substantially undisturbed. The characteristic curve of second received signal ES2 shown in the middle area of the diagram is influenced by a strong interference, which may be caused by an FMCW (frequency modulated continuous wave) radar. Third received signal ES3 illustrated in the lower part of the diagram is affected by a very strong interference of the same type.

Figure 5:
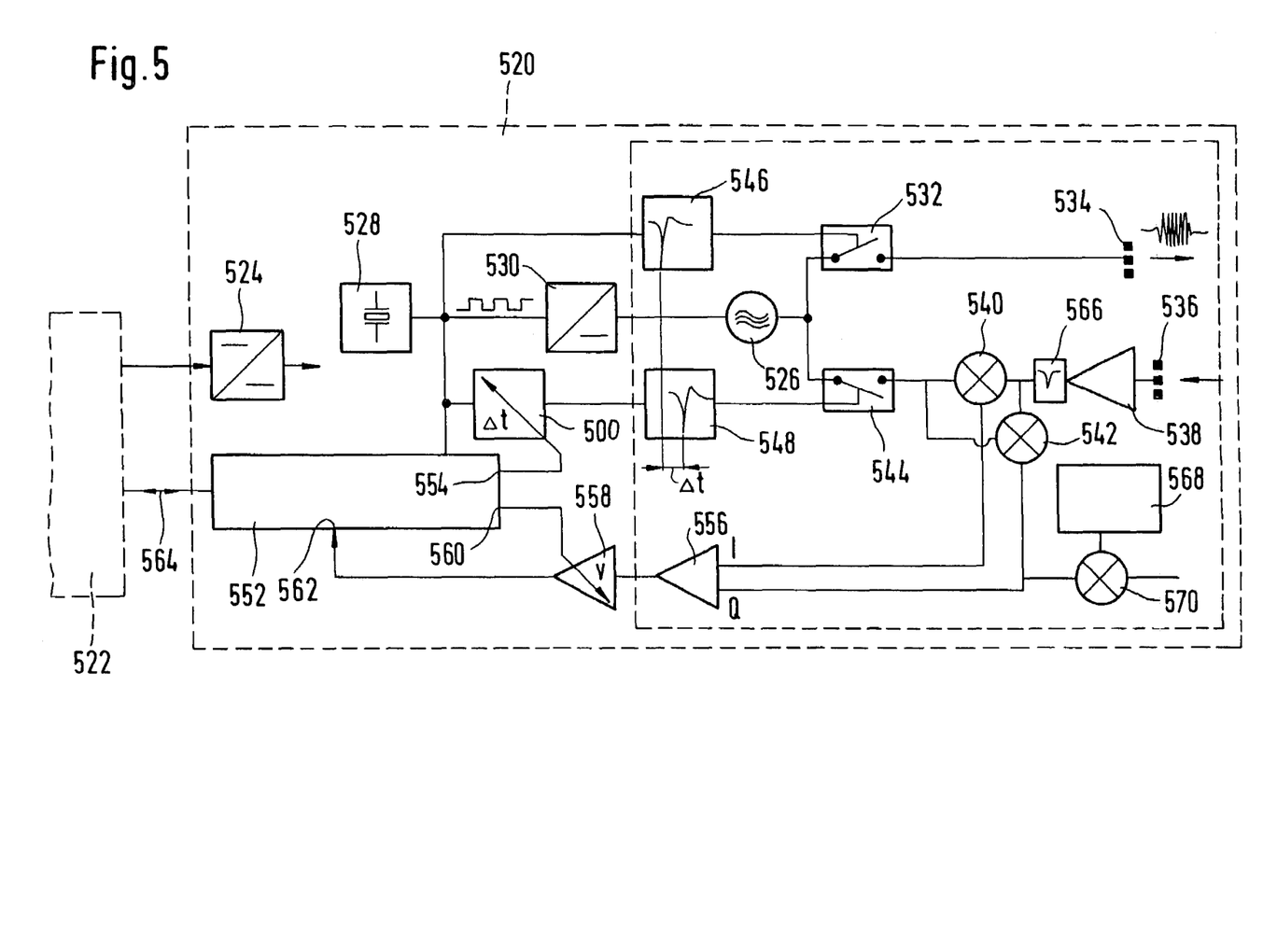
FIG. 5 shows a block diagram of a radar device.

FIG. 5 shows a block diagram of a radar device 520 which is provided for monitoring the immediately adjacent zone around a motor vehicle. A control device 522 supplies energy to radar device 520. Thus, for example, control device 522 supplies an input voltage of 8 V for radar device 520. This input voltage is fed to a DC/DC converter 524 which makes available a supply voltage of, for example, 5 V for the components of radar device 520. Radar device 520 also includes a local oscillator 526 which produces a carrier frequency of 24 GHz, for example. This local oscillator is supplied with a bias voltage generated by a converter 530, which is driven by pulses produced by a clock-pulse generator 528. The pulses produced by clock-pulse generator 528, which may have a frequency of a few MHz, e.g., 5 MHz, are used to modulate the carrier signal supplied by local oscillator 526. This modulation is carried out in the transmitting branch of radar device 520 by a switching element 532 which is controlled by a pulse shaper 546. Pulse shaper 546, in turn, is likewise driven by the clock frequency of clock-pulse generator 528. The pulsed signals generated in this manner are radiated by an antenna 534. In the case that the signals emitted by antenna 534 are reflected off of a target object, for example, the reflected signals are received by an antenna 536. Once the received signals are amplified in an amplifier 538, the signals are fed to two mixers 540 and 542. First mixer 540 then emits a so-called I-signal, while second mixer 542 outputs a 90° out-of-phase Q-signal. In mixers 540, 542, the received signals are mixed with the pulsed signals of local oscillator 526, this pulsing taking place via a switch 544. Switch 544 is driven by a pulse generator 548 which outputs delayed pulses. For example, pulses output by pulse generator 548 are delayed by a time period Δt with respect to the pulses from pulse generator 546. This delay is effected by a delay circuit 500. The duration of the delay of delay circuit 500 is influenced via a microcontroller 552, which preferably includes a digital signal processor. This is accomplished via a first analog output 554 of microcontroller 552. Via a second analog output 560, the I- or Q-signals processed by an amplifier 556 are influenced by another, e.g., variable amplification in amplifier 558. This amplifier 558 is controlled by a second analog output 560 of microcontroller 552. The output signal from amplifier 558 is fed to an analog input 562 of microcontroller 552. Microcontroller 552 communicates via an input/output bus 564 with control device 522. Radar device 520 also includes a so-called notch filter 566, which is suited for suppressing monochromatic or nearly monochromatic interference signals. Also provided are a PLL (phase-locked loop) circuit 568 and a further mixer 570. The frequency of an interference signal may be advantageously determined by tuning PLL circuit 568.

Using the above-described device, it is possible to ascertain interference in the received signal and to classify the type of interference. At this point, as soon as it is determined that the detected interference is attributable to a high traffic density, an appropriate power adaptation, which may contribute to a reduction in the interference, is carried out in accordance with the present invention. Once objects have been reliably detected, the measurement repetition rate may also be reduced. Since fewer radar signals are emitted as a result, the probability of interference being caused is also reduced. In addition, it is not necessary to utilize the maximum possible detection range; instead, the detection range may be stopped once a limit to be regarded as useful is reached, e.g., two to five detected objects, especially as the power requirement increases with the fourth power of the distance. This is explained below with reference to the flow chart of FIG. 6.

Figure 6:
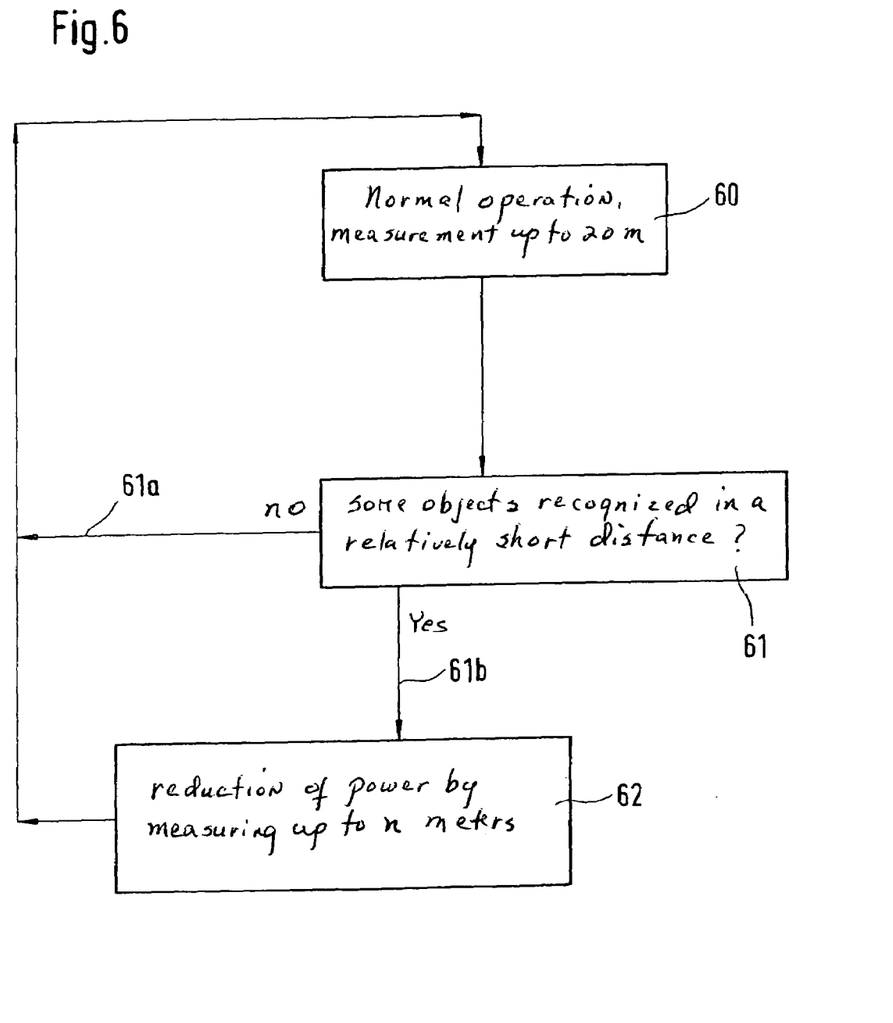
FIG. 6 shows a first flow chart illustrating the reduction of power.

In a first step 60, radar device 520 is operated in normal operation. In this normal operation, measurements are taken at regular intervals up to a maximum range of about 20 m. In a step 61, it is checked whether objects have been detected within a relatively short range. If this is not the case, alternative path 61a is selected, and the normal operation is continued in accordance with step 60. If, on the other hand, objects are detected within the relatively short range, alternative path 61b is selected, and power is reduced in accordance with step 62 in that measurements are still only taken up to a limiting distance of n m, where n<20 m. By applying the approach of the present invention, assuming a maximum distance of 20 m and limiting the emissions at the distance stages 5 m, 10 m or 15 m, the average power could be reduced by 30 db, 15 db, and 6 dB, respectively. Consequently, the spectral density is, of course, also lowered. In addition, the transmitted power could also be lowered by approximately 6 to 20 dB.

Figure 7:
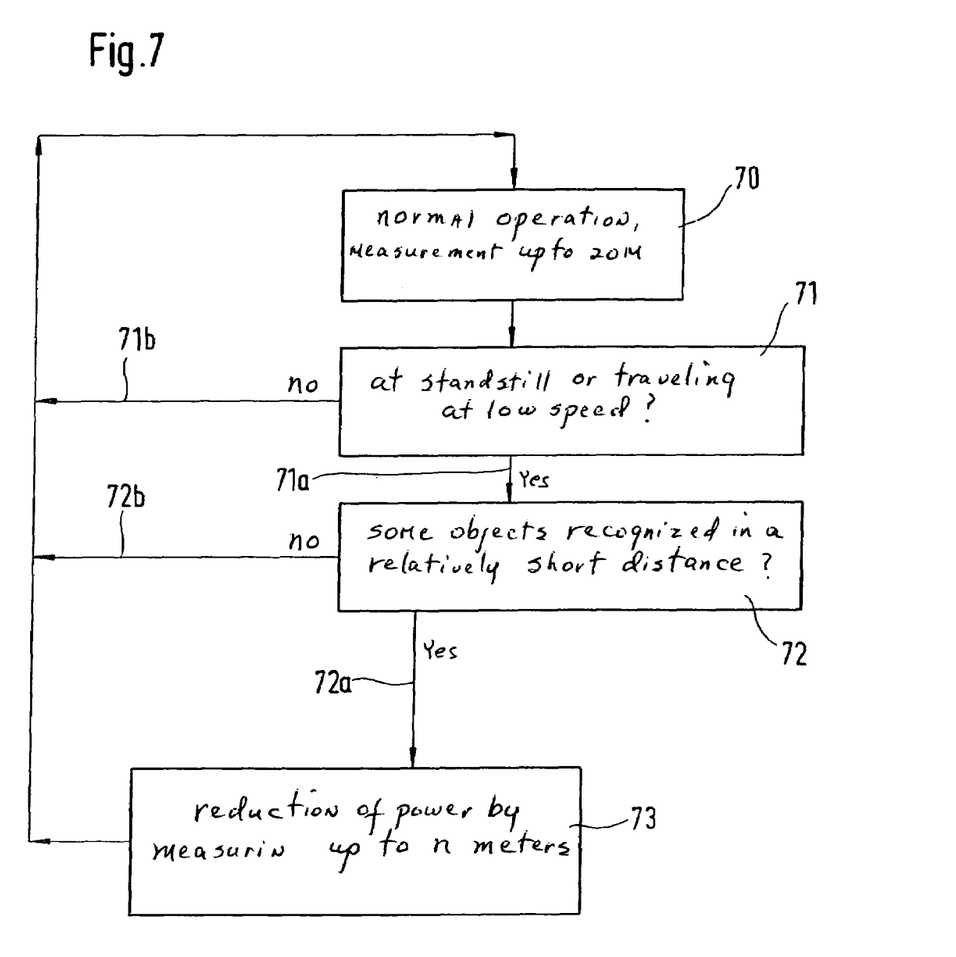
FIG. 7 shows a second flow chart illustrating the reduction of power.

An alternative approach for reducing power is explained with reference to the flow chart shown in FIG. 7. In a first step 70, radar device 520 is operated in normal operation. In this normal operation, measurements are taken at regular intervals up to a maximum range of about 20 m. In a subsequent step 71, it is checked whether the vehicle is stationary or whether it is moving at a relatively low speed. If this is not the case, alternative path 71b is selected, and the normal operation is continued in accordance with step 70. If, however, only a low speed of less than about 20 to 40 km/h is measured, or it is determined that the vehicle is stationary, alternative path 71a may be taken to arrive at step 72. In this step 72, it is checked whether objects have been detected in a distance shorter than 20 m. If this is the case, alternative path 72a is selected, and power is reduced in accordance with step 73 in that measurements are still only taken up to a limiting distance of n m, where n<20 m. The relatively low speed makes it unlikely that objects would appear unexpectedly. If necessary, however, a measurement may also be made in-between, up to the maximum range, in order to secure the intervening space and thereby enhance the safety on the whole. If this is not the case, alternative path 72b is selected, and the normal operation is continued in accordance with step 70.

The speed information may be obtained from the wheel speeds, from a radar measurement which records the ground speed, or from an SRR (secondary surveillance radar) measurement by estimating stationary objects. While the first two mentioned methods lead to very reliable results, the last-mentioned method additionally requires an exact classification into illusory objects, on the one hand, and tangible moving objects, on the other hand, to attain reliable results. Since in situations of high traffic density and, thus, a high concentration of sensors, the interfering influences increase, the present invention also makes it possible to adaptively reduce the power within a relatively short range, provided that reliably detected objects exist. The present invention makes it possible for the transmitting power to be reduced, thereby facilitating an approval in conformance with UWB (ultra-wide band) criteria. By reducing the transmitting power, the interference immunity may be further enhanced. This means that there is less mutual interference among adjacent vehicles. The reduced transmitting power leads to a lower current consumption, which is beneficial in terms of energy usage. A longer service life may be expected as well, due to the reduction in load.

What is claimed is:

1. A method for adaptively controlling the power of signals transmitted by a radar device having a radar transmitter and a radar receiver, the radar device being mounted in a vehicle, the method comprising:
   transmitting radar signals from the radar transmitter;
   receiving at the radar receiver radar signals reflected from target objects;
   analyzing the received radar signals reflected from target objects for irregularities in at least one of an amplitude or a frequency of the incoming radar signals; and
   reducing the power of radar signals transmitted by the radar transmitter if irregularities that are attributable to interference caused by neighboring radar transmitters are detected in the received radar signals reflected from target objects.

2. The method as recited in claim 1, wherein radar signals are transmitted repeatedly from the radar transmitter, and wherein a repetition rate of transmitting radar signals is reduced if irregularities that are attributable to interference caused by neighboring radar transmitters are detected in the received radar signals.

3. The method as recited in either claim 2, wherein, when the vehicle is at a standstill and traveling at a low speed, the power of radar signals transmitted by the radar transmitter is reduced in comparison to normal transmitting power, whereby a corresponding radar detection range of the radar device is reduced.

4. The method as recited in claim 3, wherein the power of radar signals transmitted by the radar transmitter is reduced in stages, whereby, starting from a maximum power level, the power of radar signals is decreased to a next lower power level when no target object has been detected in an immediately previous measuring cycle.

5. The method as recited in claim 4, wherein, after the power of radar signals transmitted has been decreased to the next lower power level, the power of radar signals transmitted is briefly increased in periodic intervals to a higher power level, in order to increase the probability of detecting target objects at increased distances.

6. The method as recited in claim 4, wherein, after the power of radar signals transmitted has been decreased to the next lower power level, the received radar signals are analyzed for irregularities that are attributable to interference caused by neighboring radar transmitters, and if no irregularities are ascertained in the received radar signals, the power of radar signals transmitted is increased to a next higher stage.

7. The method as recited in claim 3, further comprising:
   obtaining additional measured variables from a field of traffic surrounding the vehicle, the additional measured variables including at least one of traffic noise and light radiated by surrounding traffic, wherein the additional measured variables are used to ascertain at least one of a traffic density and an interference potential dependent on the traffic density, for causing irregularities in the received radar signals reflected from target objects.

8. A system for adaptively controlling the power of signals transmitted by a radar device having a radar transmitter for transmitting radar signals and a radar receiver for receiving at the radar receiver radar signals reflected from target objects, the radar device being mounted in a vehicle, the system comprising:
   an analyzing unit for analyzing the received radar signals reflected from target objects for irregularities in at least one of an amplitude or a frequency of the incoming radar signals; and
   a control unit for reducing the power of radar signals transmitted by the radar transmitter if irregularities that are attributable to interference caused by neighboring radar transmitters are detected in the received radar signals reflected from target objects.

9. The system as recited in claim 8, wherein the analyzing unit includes a phase-locked loop circuit and a mixer for determining the frequency of interference signals.

* * * * *